(12) United States Patent
Newbold et al.

(10) Patent No.: US 6,250,515 B1
(45) Date of Patent: Jun. 26, 2001

(54) LIQUID DISPENSER HAVING DRIP PREVENTING VALVE

(75) Inventors: John Newbold; Brian Verrilli, both of Carlsbad, CA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 09/430,407

(22) Filed: Oct. 29, 1999

(51) Int. Cl.$^7$ .................................................. F16K 31/08
(52) U.S. Cl. ........................ 222/504; 222/509; 222/518; 251/65
(58) Field of Search ............................. 251/65; 239/583, 239/585.1; 222/509, 518, 504

(56) References Cited

U.S. PATENT DOCUMENTS

| | | | |
|---|---|---|---|
| 3,348,543 | * 10/1967 | Stafford | 222/504 X |
| 3,609,425 | * 9/1971 | Sheridan | 251/65 X |
| 5,685,459 | * 11/1997 | Wardle | 222/504 X |
| 5,904,300 | * 5/1999 | Augustin | 239/585.1 X |
| 6,003,734 | * 12/1999 | Oh | 222/504 X |
| 6,053,425 | * 4/2000 | Stringfellow | 239/585.1 X |

* cited by examiner

Primary Examiner—Kenneth Bomberg
(74) Attorney, Agent, or Firm—Wood, Herron & Evans L.L.P.

(57) ABSTRACT

Apparatus for dispensing liquids, such as viscous liquids used during the manufacture of electronic component assemblies. The apparatus includes a valve body having a liquid passage with a valve seat and an outlet. A needle is mounted for reciprocating movement between open and closed positions in the liquid passage and with respect to the valve seat to dispense liquid from the outlet. An armature is connected for reciprocating movement with the needle and a magnetic element is mounted outside the liquid passage and movable between a first position that attracts the armature and moves the needle into the open position and a second position at which the armature and the needle are forced to the closed position by way of a return spring. An actuator is operatively connected to the magnetic element to move the magnetic element between the first and second positions.

15 Claims, 4 Drawing Sheets

LIQUID DISPENSER HAVING DRIP PREVENTING VALVE

FIELD OF THE INVENTION

The present invention relates generally to liquid dispensers and, more particularly, to dispensers utilizing reciprocating valve stems to selectively dispense liquid through an outlet.

BACKGROUND OF THE INVENTION

Various liquid dispensers, such as positive displacement piston pumps, are used to accurately dispense viscous liquids. These pumps may be used, for example, during the manufacture of semiconductor chip packages to dispense encapsulant material around a silicone die after the silicon die has been electrically connected to a substrate, such as a PC board. For many applications, it is desirable to dispense these viscous liquids in near vacuum conditions. Vacuum encapsulation has been developed to better obtain void-free encapsulation of the silicon dies. Typically, capillary action pulls the encapsulant material beneath the die to encapsulate all of the wire bonded leads and electric contacts between the die and the substrate. Void-free encapsulation ensures that the delicate wire bonded leads are protected from moisture, chemical attack and mechanical stresses.

The pumps normally used to dispense such materials rely on atmospheric pressure to keep the liquid from dripping out of the outlet between dispensing cycles. Essentially, these pumps operate similar to syringes and dispense liquid only when a piston or plunger displaces the liquid from a supply chamber or passage through an outlet. When the piston or plunger is stopped, atmospheric pressure will keep the liquid from dripping out of the outlet. However, under near vacuum conditions these types of pumps or dispensers will drip upon shut-off and, as a result, the liquid will fall on unintended areas of the substrate or surrounding components.

During the vacuum encapsulation of semiconductor chip packages, accurate repeatability of the dispensed encapsulant material is also very important. Therefore, any valve structure used in conjunction with the dispensing pump must not have characteristics which adversely affect this accuracy and repeatability. Conventional pneumatically or electrically-actuated valves will typically have internal seals and other components that break or modify the fluid path such that highly accurate, minute amounts of liquid may be dispensed from the outlet. In these applications, it is therefore preferable that the liquid enters the valve and flows through a constant fluid path which will not change in volume, such as due to the presence of various compressible seals, even under very high pressures on the order of 500 psi to 1,000 psi and above. With specific regard to electrically-actuated valves, these valves will generate heat which is very difficult to dissipate in a near vacuum environment. Therefore, the life of any electrically-actuated valve would be significantly shortened in a near vacuum environment.

For at least the various reasons discussed above, it would be desirable to provide a highly accurate liquid dispenser which prevents dripping in near vacuum conditions but does not have other drawbacks associated with prior dispensing valves.

SUMMARY OF THE INVENTION

The present invention generally provides a dispensing apparatus using at least one magnetic element for reciprocating a needle within a valve body between open and closed positions. Generally, the apparatus includes a valve body with a liquid passage containing a valve seat and communicating with an outlet. A needle is mounted for reciprocating movement between open and closed positions in the liquid passage and with respect to the valve seat to dispense liquid from the outlet. An armature is connected for reciprocating movement with the needle and an actuatable magnetic element is mounted outside the liquid passage and, preferably, outside the valve body. The magnetic element moves between a first position that magnetically maintains the armature and the needle in the open position against the force of a return spring and a second position in which the armature and the needle are moved to the closed position by the return spring. An actuator is operatively connected to the magnetic element to facilitate its movement between the first and second positions. In the preferred embodiment, this actuator is a pneumatic actuator, specifically in the form of an air cylinder having a reciprocating piston, but other actuators may be used as well.

As a more specific feature of the invention, the magnetic element may further comprise opposed permanent magnets mounted on opposite sides of the armature. The armature preferably comprises a member carried by the needle and formed from a ferrous metal. The armature may be an integral portion of the needle or a portion separately affixed to the needle. In the preferred embodiment, a carrier is mounted for movement between the first and second positions in a direction transverse to the movement of the needle. The carrier includes magnet mounting portions disposed adjacent opposite sides of the valve body. The permanent magnets are respectively mounted to the magnet mounting portions. The magnets at least substantially align with the armature when the needle is in the open position and are substantially out of alignment with the armature when the needle is in the closed position.

In operation, pressurized liquid is introduced into the liquid passage within the valve body with the needle initially disposed in the closed position under the force of the return spring. The permanent magnets disposed outside the valve body are moved by the actuator to a position facilitating a magnetic attraction between the armature and the magnets. The magnetic attraction causes the needle to move away from the valve seat against the force of the return spring and allows liquid to move through the outlet. When the magnets are moved to the second position, the magnetic force or attraction between the magnets and the armature is less than the spring force and, therefore, the spring forces the needle to the closed position to stop the flow of liquid.

Various objectives, features and advantages of the invention will become more readily apparent to those of ordinary skill in the art upon review of the following detailed description of the preferred embodiments taken in conjunction with the accompanying drawings.

DETAILED DESCRIPTION OF THE PREFERRED EMBODIMENTS

Figure 1:
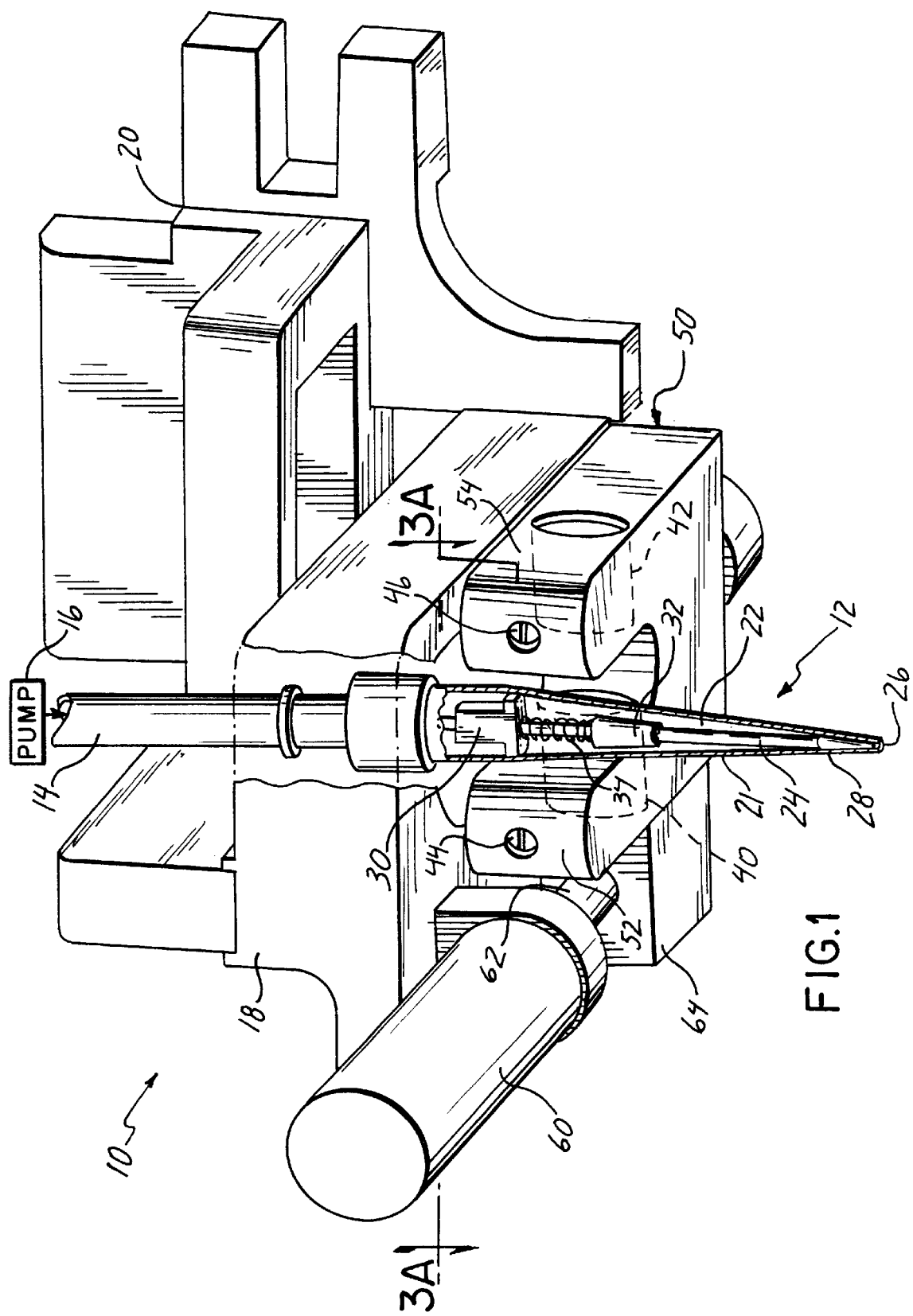
FIG. 1 is a diagrammatic perspective view of a liquid dispensing apparatus incorporating a valve and valve actuator according to the preferred embodiment in a closed position.
Figure 1A:
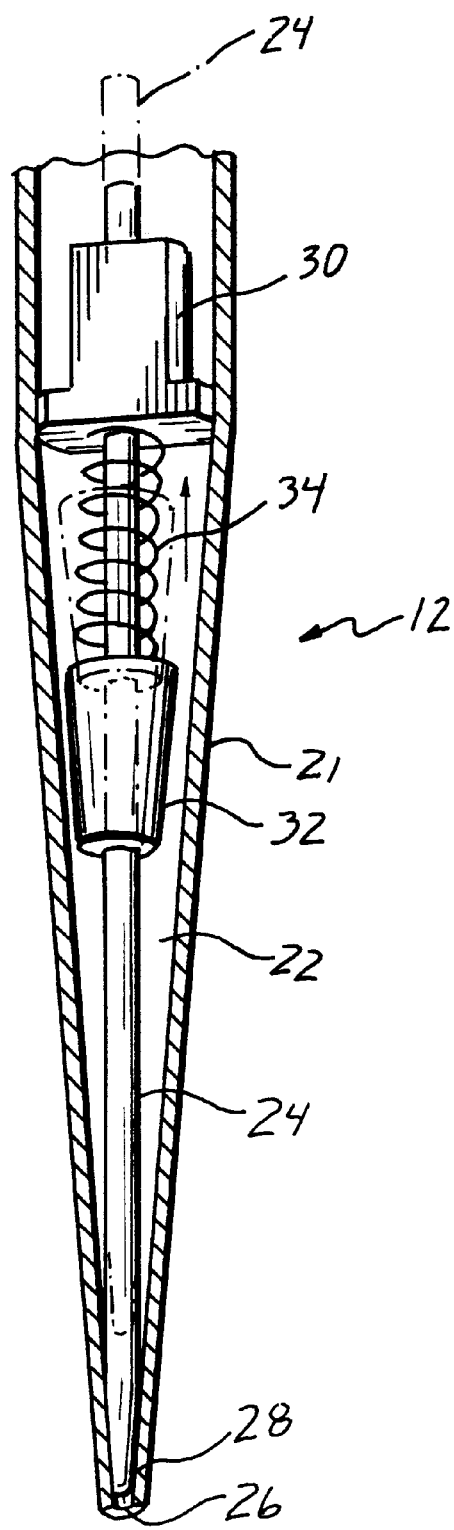
FIG. 1A is an enlarged, partial cross sectional view of the valve shown in FIG. 1.
Figure 2:
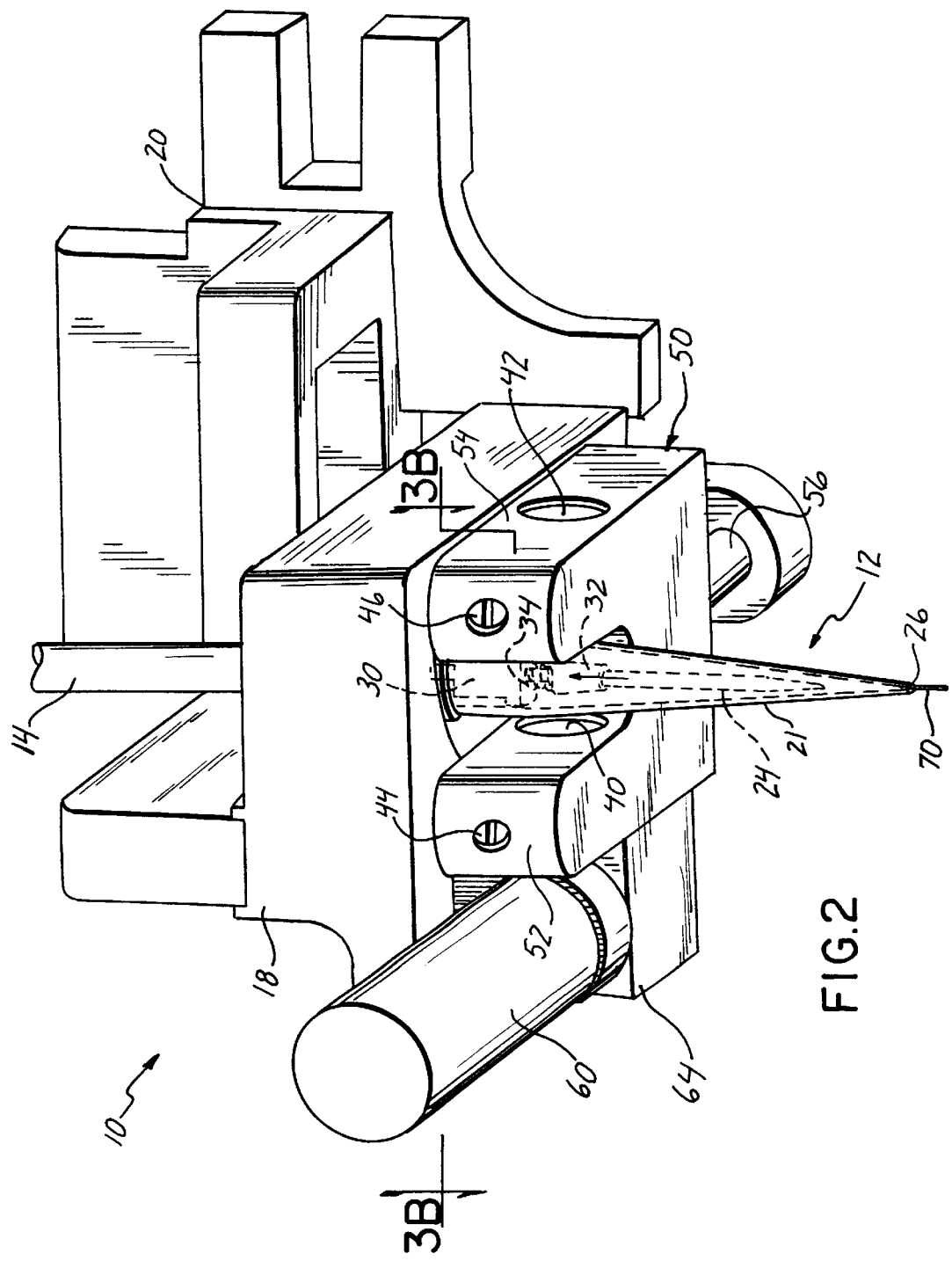
FIG. 2 is a diagrammatic perspective view similar to FIG. 1, but illustrating the valve actuated to an open position.

Referring to FIGS. 1, 1A and 2, a liquid dispensing apparatus 10 is shown and includes a valve 12 constructed in accordance with a preferred embodiment of the invention. A conduit 14 directs liquid into valve 12 from a pump 16. Valve 12 is mounted within a support member 18. Support member 18 may be fixed to a mounting bracket 20 forming part of a pump system. Any number of pump systems may utilize valve 12 and, for this reason, the complete pump system is not shown in the drawings as it forms no part of the inventive principles discussed herein. However, a suitable apparatus for use with the present invention is the DP Series 3000 pump available from Asymtek, located in Carlsbad, Calif. A similar system capable of benefitting from the valve and valve actuating structure of the present invention is disclosed in U.S. Pat. No. 5,927,560, the disclosure of which is fully incorporated by reference herein. The valve and valve actuating structure of the invention is especially beneficial in near vacuum dispensing environments. One example of such a system is disclosed in U.S. patent application Ser. No. 09/322,416, filed on May 28, 1999, and the disclosure of which is fully incorporated by reference herein.

Valve 12 more specifically includes a valve body 21 having an internal liquid passage 22 and a needle 24 mounted for reciprocating movement within liquid passage 22. Needle 24 is mounted for movement with respect to an outlet 26 and, more specifically, with respect to a valve seat 28 disposed adjacent outlet 26. Needle 24 is further received for reciprocating movement within a stationary stop member 30 affixed within liquid passage 22. An armature 32 is coupled to needle 24 for movement therewith and a return spring 34 is located between armature 32 and stop member 30 and disposed about needle 24. For reasons to be discussed below, armature 32 is preferably formed from a ferrous metal, such as mild steel, while the remainder of needle 24 may be formed from non-ferrous metal, such as stainless steel or carbide. Stop member 30 and armature 32 are sized and configured to allow the flow of liquid from conduit 14 through liquid passage 22 and ultimately through outlet 26 when valve 12 is in an open position.

A pair of permanent magnets 40, 42 are used to actuate needle 24 to the open position and are preferably formed from Neodymium-Iron-Boron. Magnets 40, 42 are held in place by set screws 44, 46 within a carrier 50 in the preferred form of a clevis having two arms 52, 54 serving as magnet mounting portions disposed on opposite sides of valve body 21. Carrier 50 is mounted for reciprocation along a rod 56 carried in a bore 58 and moves in a direction transverse to the movement of needle 24. Carrier 50 may be reciprocated back and forth by an air actuator 60 preferably in the form of a cylinder with a reciprocating piston 62 connected to a mounting member 64. Mounting member 64 is rigidly affixed to carrier 50 using a bolt 66.

Figure 3A:
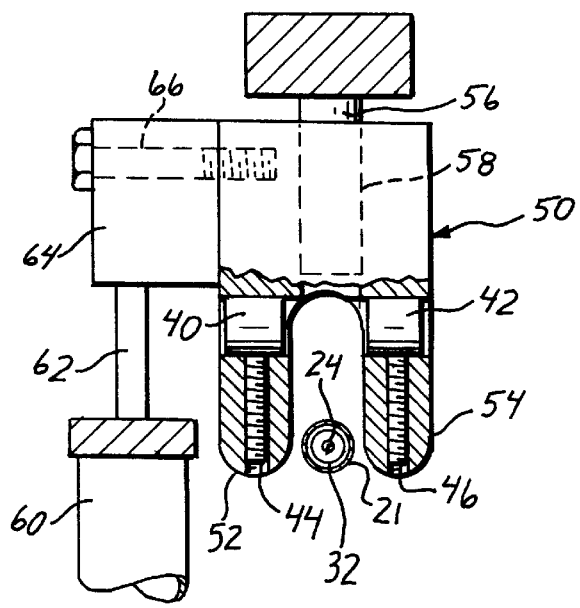
FIG. 3A is a cross sectional view of the apparatus taken generally along line 3A—3A of FIG. 1.
Figure 3B:
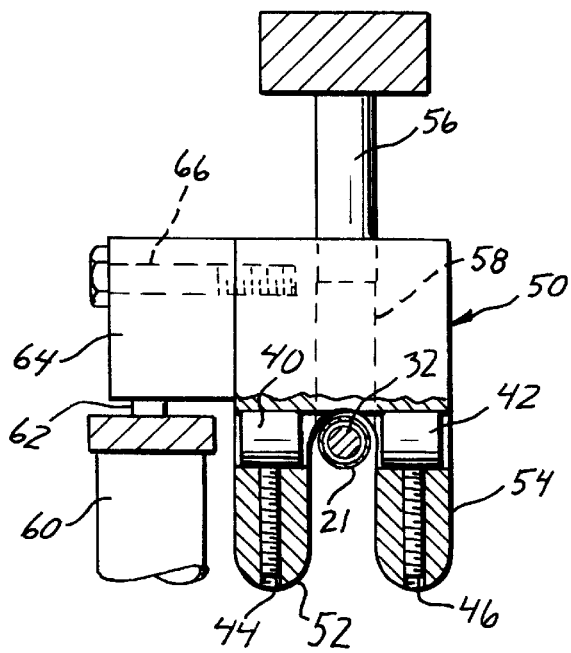
FIG. 3B is a cross sectional view generally taken along line 3B—3B of FIG. 2.

When air actuator or cylinder 60 retracts piston 62 to the position shown in FIGS. 2 and 3B, magnets 40, 42 are in alignment on opposite sides of valve body 21. This draws armature 32 and the attached needle 24 upwardly against the force of return spring 34 (FIGS. 1A and 2). Armature 32 is lifted to a position preferably in direct alignment with magnets 40, 42. Needle 24 is thereby lifted off of valve seat 28 to dispense a bead or drop of liquid 70, as necessary, onto a substrate (not shown). When air actuator or cylinder 60 extends piston 62, as shown in FIGS. 1 and 3A, carrier 50 will be moved along rod 56 such that magnets 40, 42 are no longer in substantial alignment with valve body 21. This reduces or eliminates any magnetic attraction between magnets 40, 42 and armature 32 to such an extent that return spring 34 forces armature 32 and the attached needle 24 downwardly to the closed position in which needle 24 engages valve seat 28 to stop the flow of liquid.

Figure 4:
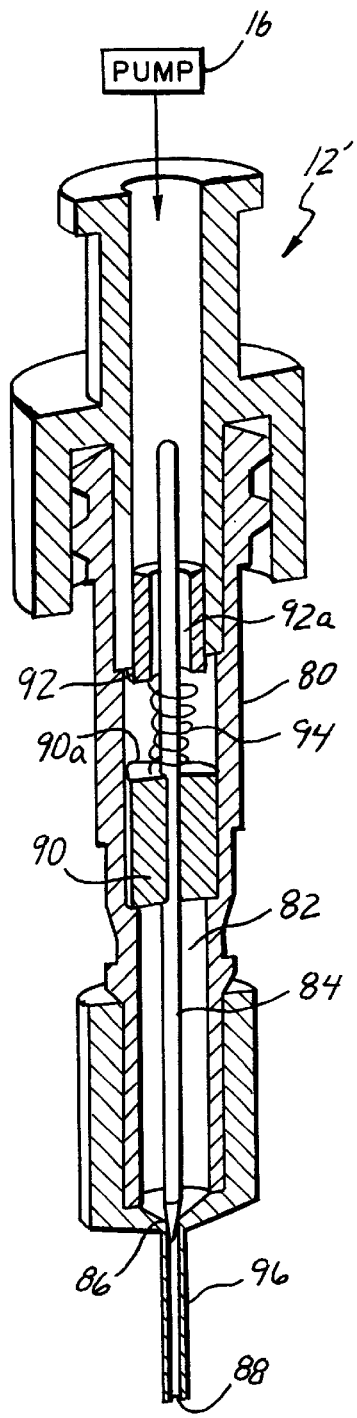
FIG. 4 is an axial cross sectional view of an alternative valve usable in liquid dispensing apparatus constructed in accordance with the invention.

FIG. 4 illustrates an alternative valve 12' constructed in accordance with the inventive principles. Valve 12', like valve 12, includes a valve body 80 having an internal liquid passage 82 receiving a needle 84 mounted for reciprocating movement. Needle 84 engages a valve seat 86 in the closed position, as shown, and disengages valve seat 86 to dispense liquid through an outlet 88. An armature 90 is carried by needle 84 for the same purpose as armature 30 in the first embodiment. A hollow stop member 92 is fixed in a stationary manner within liquid passage 82 and receives needle 84 in a manner that allows reciprocation of needle 84 and liquid flow through the hollow center portion 92a of stop member 92 and past needle 84. A return spring 94 is positioned between armature 90 and stop member 92 for the same purpose as described above with respect to the first embodiment. Armature 90 includes straight side walls 90a on opposite sides thereof to allow liquid flow through passage 82. This embodiment operates identically to the first embodiment with the only significant differences being the different configuration for stop member 92 and the use of a straight dispensing tube 96 between outlet 88 and valve seat 86.

Many different modifications of the specific details herein may be made in accordance with the inventive principles. As some examples, the opposed permanent magnets of the invention may be replaced by a single magnet or additional magnets disposed around the periphery of the valve body. In the case of using a single magnet, this may be a single magnet disposed on one side of the valve body or a ring magnet which surrounds the valve body. Optionally, an electromagnet may be used in certain applications, however, this may lead to overheating problems in a near vacuum environment as mentioned above. As another possibility, the armature itself may be a magnetic element such that the attraction forces may be increased between the armature and the outside magnetic element or elements. In certain applications utilizing a magnetic armature carried by the valve needle and an exterior magnet or magnets, repulsive forces may be used to move the needle to the open position. Although a return spring is utilized in the preferred embodiment, other devices, including magnetic devices, may be used to move the needle to the closed position. The valve of the present invention is preferably used in conjunction with a positive displacement pump, such as a piston pump, however it may be used in conjunction with other pressurized liquid supply devices as well.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept. The scope of the invention itself should only be defined by the appended claims, wherein I claim:

What is claimed is:

1. Apparatus for dispensing liquid and prevent dripping of said liquid upon stopping a dispense cycle under near vacuum conditions, the apparatus comprising:

a valve body including a liquid passage with a valve seat and an outlet, a needle mounted for movement between open and closed positions in said liquid passage and with respect to said valve seat to selectively dispense liquid from said outlet, an armature connected for movement with said needle between said open and closed positions, a magnetic element mounted outside said valve body adjacent said liquid passage and movable between a first position that imparts sufficient magnetic force to said armature to maintain said armature and said needle in said open position and a second position at which the magnetic force is reduced and said armature and said needle are allowed to move to said closed position, a powered actuator operatively connected to the magnetic element to move the magnetic element between the first and second positions, and a spring operatively connected with said needle to force the needle to the closed position when said magnetic element is in the second position.

2. The apparatus of claim 1, wherein the magnetic element further comprises opposed permanent magnets mounted generally on opposite sides of said armature such that said opposed magnets are in substantial alignment with said armature when said armature and needle are in the open position and the opposed magnets are in the first position and substantially out of alignment when said armature and needle are in the closed position and the opposed magnets are in the second position.

3. The apparatus of claim 2, wherein said armature further comprises a separate member connected to said needle and formed from a ferrous metal.

4. The apparatus of claim 2 further comprising:

a carrier mounted for movement between the first and second positions and having magnet mounting portions disposed adjacent opposite sides of said valve body, said permanent magnets being mounted respectively to said magnet mounting portions.

5. The apparatus of claim 1, wherein said powered actuator further comprises an air actuator.

6. The apparatus of claim 1 further comprising a stop member mounted adjacent said needle for engaging and stopping said armature when the needle moves from the closed position to the open position.

7. The apparatus of claim 1, wherein the magnetic element is movable by said actuator in a direction transverse to the movement of said needle.

8. Apparatus for dispensing liquid and preventing dripping of said liquid upon stopping a dispense cycle under near vacuum conditions, the apparatus comprising:

a valve body including a liquid passage with a valve seat and an outlet, a needle mounted for reciprocating movement between open and closed positions in said liquid passage and with respect to said valve seat to selectively dispense liquid from said outlet, an armature carried on said needle, a carrier mounted for reciprocation outside said valve body and having at least one portion thereof extending generally adjacent said needle, a powered actuator coupled with said carrier to reciprocate said carrier between first and second positions, a magnetic element on said carrier and movable with said carrier between said first position, which magnetically attracts said armature and thereby moves said needle to said open position, and a second position at which said armature is under less magnetic attraction, and a spring operatively connected with said needle for moving said needle to the closed position when the magnetic element is in its second position.

9. The apparatus of claim 8, wherein the magnetic element further comprises opposed permanent magnets mounted generally on opposite sides of said armature such that said opposed magnets are in substantial alignment with said armature when said armature and needle are in the open position and the opposed magnets are in the first position and substantially out of alignment when said armature and needle are in the closed position and the opposed magnets are in the second position.

10. The apparatus of claim 9, wherein said armature further comprises a separate member connected in surrounding relation to said needle and formed from a ferrous metal.

11. The apparatus of claim 8, wherein said powered actuator further comprises an air actuator.

12. The apparatus of claim 8 further comprising a stop member mounted adjacent said needle for engaging and stopping said armature when the needle moves from the closed position to the open position.

13. A method of magnetically actuating a valve in a liquid dispenser, said valve including a valve body with a liquid passage, a valve seat and a needle mounted for reciprocating movement with respect to the valve seat between open and closed positions, said needle being coupled for movement with an armature, the method comprising:

filling the liquid passage in the valve body with a liquid under pressure, spring biasing the needle in the closed position against said valve seat, activating a powered actuator to move a magnetic element disposed outside said valve body to a position disposed sufficiently close to the armature to move said needle by magnetic force to the open position against the spring bias, and dispensing the liquid when said needle is in the open position.

14. The method of claim 13, wherein moving the magnetic element further comprises:

activating an air actuator to move a carrier including the magnetic element.

15. The method of claim 13, wherein the step of moving the magnetic element further comprises:

moving a pair of opposed, permanent magnets mounted adjacent opposite sides of said valve body.

* * * * *